Patented Sept. 23, 1952

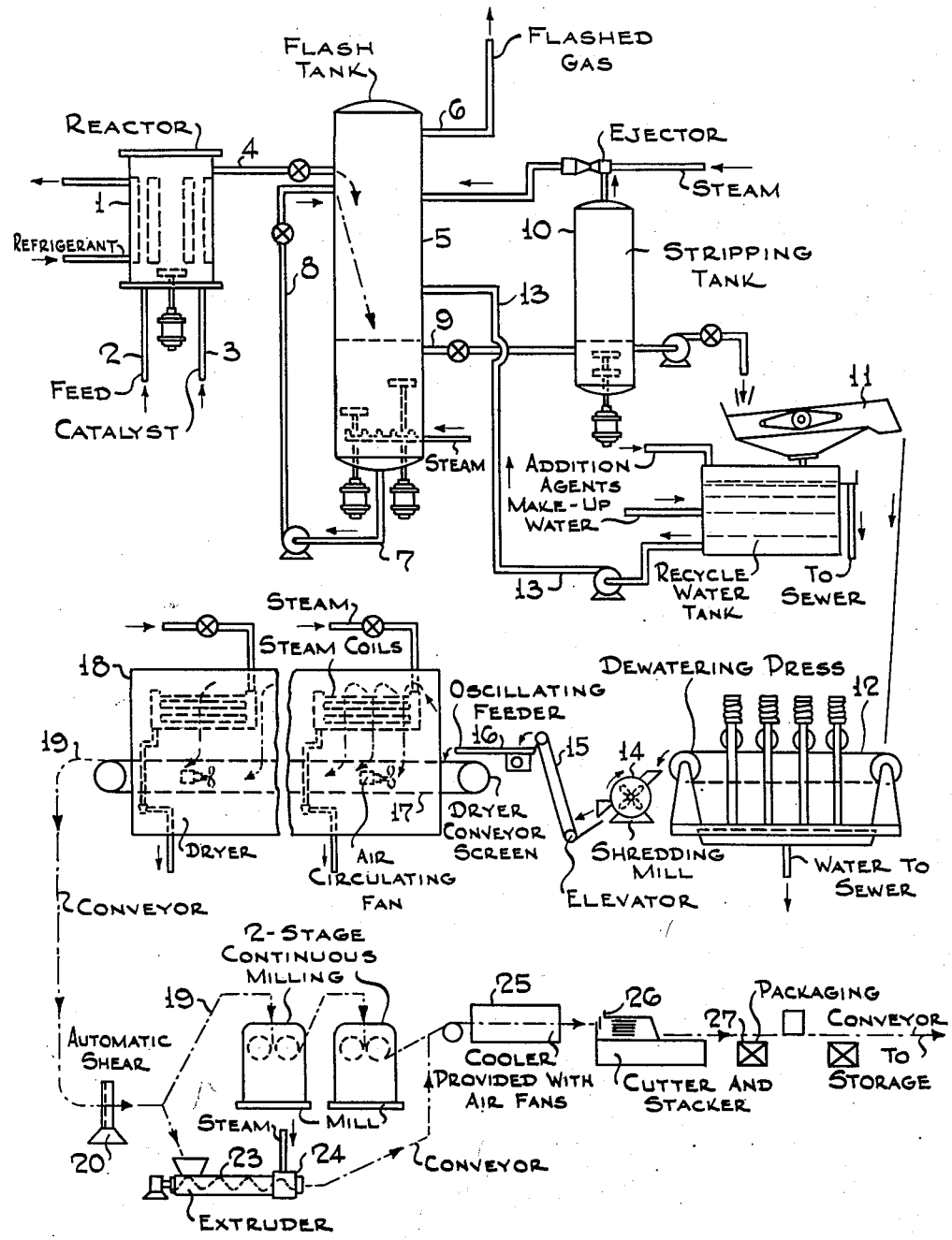

2,611,751

UNITED STATES PATENT OFFICE 2,611,751

ANTITACK AGENT

Grady R. Scott, Baton Rouge, La., assignor to Standard Oil Development Company, a corporation of Delaware Application July 19, 1947, Serial No. 762,189

6 Claims. (Cl. 260—23.7)

This invention relates to polymerization processes and apparatus and particularly to processes and apparatus for the low temperature polymerization of iso-olefins or mixtures of iso-olefins and diolefins.

Certain preferred details of the process and apparatus will be apparent and the invention itself will be best understood by reference to the following specification and accompanying drawing.

It has been known for some time that high molecular weight polymers, i. e., having a molecular weight of from about 15,000–25,000 up to 300,000 or more (as determined by the Staudinger method) are obtained if iso-olefins, such as isobutylene, are contacted with Friedel-Crafts type catalyst such as aluminum chloride and the like at temperatures below about —10° F. (See, for example, Mueller-Cunradi U. S. Patent No. 2,203,873, issued June 11, 1940.) More recently it was found that a copolymer which is curable with sulfur is obtained if a mixture of about 70 to 99.5 weight per cent of an iso-olefin such as isobutylene with about 30 to 0.5 weight per cent of a conjugated diolefin such as butadiene or isoprene is treated with a solution of a Friedel-Crafts type catalyst such as aluminum chloride in a non-complex forming low freezing solvent such as methyl or ethyl chloride and at temperatures of between —10° F. and —250°., preferably between —20° F. and —150° F. (See, for example, Australian Patent No. 112,875, issued July 31, 1941.) Copolymers of iso-olefins with aromatic hydrocarbons, having unsaturated side chains, such as styrene may also be formed at these low temperatures. These polymerizations have been conducted in the presence of an internal refrigerant such as liquefied ethylene, in which case the heat of reaction is removed directly by evaporation of part of the ethylene without the necessity for transferring heat through the surfaces of the reaction vessels or through cooling coils arranged in the reaction vessels, or in the presence of large quantities of a diluent such as methyl chloride, cooled by external means. Consequently, the reaction is now carried out in such a manner as to keep the solid polymer particles in a finely divided condition suspended in the cold reaction mixture so that a slurry of solid polymer in the cold reaction mixture is obtained which can be handled at low temperature. In view of the inflammable nature of certain of the reactants the slurry is discharged into a well-agitated body of a heated liquid medium, such as water, which may be designated as the flashing medium in which the polymer is suitably insoluble and which is maintained at a temperature well above the boiling point of the majority of the volatile materials accompanying the polymer, to form a slurry of finely divided polymer particles in the warm liquid and to flash off the reaction mixture. This slurry is then stripped of any residual volatile materials and dried while being carried through a tunnel on a screen or on sections of a perforated plate in the presence of warm air. It has also been the practice to coat the conveyor surfaces with agents such as zinc stearate, zinc oxide, aqueous soap solution, a soap of an alkaline earth metal, talc, clays, castor oil, corn oil and similar materials, in order to alleviate the problem of the polymer sticking to the dryer surfaces.

This is a particularly critical problem with regard to these types of polymers since they exhibit far greater sticking abilities than the usual type of synthetic rubbers. For example, the following comparative data on the relative stickiness of uncompounded polymers produced by the above process and those produced by copolymerizing butadiene with styrene.

| Polymer | Raw Stock Strength, Lbs./sq. in. | Tack Strength [1] Lbs./sq. in. | Percent of Original Stock Strength Exhibited |
|---|---|---|---|
| Copolymer of isoprene and isobutylene as described above | 38.6 | 37.0 | 95.8 |
| Copolymer of butadiene and styrene | 45.6 | 7.5 | 16.4 |

[1] Contact time 60 seconds under force of 2.65 lbs.

It will be noted that by sticking fresh cut surfaces of the copolymer of isoprene and isobutylene together with 95.8% of the original raw strength is obtained while only 16.4% is obtained for the copolymer of butadiene and styrene. This indicates that the copolymer of isoprene and isobutylene is far stickier than the copolymer of butadiene and styrene and therefore it is more difficult to prevent the copolymer of isoprene and isobutylene from sticking to the drier screen during drying operations.

However, these materials may possess many disadvantages which make them undesirable to use or which impose limitations on the process. Zinc stearate fuses at temperatures substantially above 220° F., and when the dryer temperature is kept low enough to prevent fusion, the polymer is often inadequately dried. Above its melting point, however, zinc stearate loses much of its anti-sticking effect against iso-olefinic polymers.

The use of dry talc or clays is not usually satisfactory because the dry pigments are not sufficiently adherent to the dry screen to be serviceable under the conditions of use. If wetted or applied as a slurry, pigments such as zinc oxide, talc and clays form coatings which either become powdery and flaky upon drying with the result that such coatings are largely removed from the screen upon contact with the polymers or which web over and plug the perforations or screen openings in the conveyor, thus interfering with the circulation of air through the bed of polymer.

It is, therefore, the principal object of this invention to provide a method of removing volatile impurities from polymers which will permit more efficient operation of process and prevent sticking of the polymers to the heated surfaces of the apparatus.

A further object of this invention is to provide a coating which will not readily be removed completely from the metal surfaces by polymers, which does not appreciably affect polymer quality and which will permit drying the polymer at temperatures above 250° F.

These and other objects of this invention are accomplished by passing the polymer through a heating zone, the polymer contacting surfaces of which are coated with an emulsion of a low vapor pressure fatty oil, and an emulsifying agent.

In order to make the invention more clearly understood, there is shown in the accompanying drawing one means for carrying the same into practical effect.

Referring, therefore, to the drawing, there is shown a reactor 1 wherein iso-olefinic materials and preferably mixtures of iso-olefinic and diolefinic materials alone or together with a diluent supplied through feed inlet 2 are reacted at low temperatures, preferably around −140° F., by the addition of a Friedel-Crafts catalyst supplied through line 3. The polymer formed as a slurry of fine solid polymer particles suspended in cold reaction medium comprising unreacted hydrocarbons, diluents, catalyst and catalyst solvent as well as impurities is withdrawn from the reactor through line 4 and is discharged into flash tank 5 containing a liquid, such as water, inert to the polymer and maintained at a temperature of approximately 150° F. wherein the volatile materials associated with the polymer are flashed into vapor. The flashed gases are withdrawn from the flash tank through line 6 and are passed to suitable purification and recovery means for reconditioning the flashed materials for reuse in the process.

The water or other liquid medium is heated, as by the introduction of steam thereinto, and vigorously agitated by means of suitable stirrers or the like to keep the polymer suspended as a uniform slurry in the liquid. Liquid may also be withdrawn from the flash tank through line 7 and pumped back into the flash tank as at 8 in such a manner as to impinge against the polymer stream entering the flash tank thereby breaking it up in order to prevent agglomeration of the polymer into relatively large masses which might plug the water slurry system and which might contain excessive amounts of trapped volatile liquid.

The polymer is withdrawn from the flash tank through line 9 as a slurry of finely divided solid particles suspended in the warm liquid and is discharged into the stripping tank 10. The treatment of the polymer as a slurry in the warm fluid, if necessary with injection of stripping vapors such as steam, is carried out to such a degree that nearly all the highly volatile materials originally absorbed in or adsorbed on the polymer and dissolved in the liquid are removed. A preferred type of operation is one in which the volatiles are removed in two zones, the first, as in flash tank 5 at atmospheric or slightly above atmospheric pressure and the other as in stripping tank 10 at below atmospheric pressure. Preferably, the water in the stripper 10 is boiling, due to use of vacuum. The flow of water is usually so large that steam does not have to be added to the stripper when the water enters hot enough.

The slurry of finely divided polymer in warm liquid, desirably water, is passed from the stripping tank 10 onto a vibrating screen 11 or other means for separating the bulk of the suspending liquid, such as a rotary vacuum filter. After being separated from the greater part of the suspending liquid, it is discharged into a dewatering press 12 of the endless screen type wherein it is passed between pressure rollers which squeeze out further amounts of water or suspending liquid. The water or the like passing through the vibrating screen is desirably collected, make-up liquid and any desired addition agents, such as alkalies for reducing acidity caused by decomposition of the catalyst, zinc stearate, dispersing agents, etc. are added, whereupon the liquid is recycled to the flash tank through line 13. The liquid removed in the press 12 may be discharged to the sewer or recovered in suitable fashion.

The polymer is then discharged into a suitable disintegrating means such as a hammer mill 14 in order to reduce the size of the polymer particles preparatory to discharge into the dryer system. The polymer particles discharged from the hammer mill are conveyed by suitable means such as an elevator 15 to an oscillating feeder 16 which serves to distribute the polymer on the conveyor screen 17 passing through the dryer 18.

The polymer is passed from the endless dryer conveyor 17 to conveying means 19 for carrying it to the compressing means. In the case where the material is discharged from the dryer in the form of a blanket, a large automatic shear 20 may be provided to cut it into small, easily handled pieces or a set of tearing rolls or some other mechanical shredder can be used.

The compressing of the polymer may be effected by passing it once or several times through a hot or cold rubber mill to give a relatively compact and smooth sheet which may be cut and stacked or folded into a suitable container, or alternatively, it may be extruded and then packaged in the same way or it may even be baled directly as it comes from the dryer. If small traces of moisture still remain in the material leaving the dryer (as, for example, after drying soft stocks), it is possible to remove this water expeditiously and with a minimum of mechanical breakdown by hot extrusion followed by batch or continuous milling into a suitable sheet. In the drawing, mills 21 and 22 are shown in which the polymer may be subjected to continuous milling in two stages. An extruder 23 which may also, if desired, be provided with a steam jacket 24 may be used for compressing the polymer. With the arrangement shown, the polymer may be milled or extruded or both as desired.

Another purpose of this compressing step in this sequence of finishing operations is to put the polymer into a form having a minimum of surface exposed to the air. The deterioration of the polymer which takes place very slowly during storage even under the best of conditions is known to occur principally at the surface of the material where exposed to the air and, by decreasing the surface area of a given amount of polymer by compacting it, the rate of deterioration is markedly decreased. Also, after proper packaging, the container further reduces the exposure to air and consequent deterioration. The packaging of the compressed polymer is conveniently effected by passing the sheeted polymer from the mill or extruder into a suitable cooler 25 wherein it is cooled to about 160° F. or below and preferably to about room temperature, whereupon it is passed to the cutting and stacking machine 26 and placed in suitable containers as at 27.

According to the invention, polymer from which the major quantity of liquid has been removed by pressing, etc., is treated in the dryer under conditions to remove the residual adhering or occluded fluid, usually water, as well as traces of impurities or by-products of relatively low volatility carried through with the polymer from the reaction zone. The drying or removal of the aforesaid impurities or by-products is effected without subjecting the polymer to temperatures or mechanical treatment sufficient to materially degrade the physical properties of the polymer and without initiating chemical reactions which would induce deterioration of the product in storage. For this purpose, it may be desirable to have a small amount of a stabilizer present, such as phenylbetanaphthylamine. Removal of substantially all of the water and volatile impurities is essential since appreciable amounts thereof usually interfere with proper processing of the uncured polymers or tend to cause blistering during curing of articles which are subsequently fabricated from the polymer.

The dryer used may be a continuous conveyor dryer, the polymer being carried through a tunnel on a screen or on sections of perforated plate, although other types of dryers may be used. The dryer is preferably of a tunnel, continuous conveyor, through-flow type of either one or more passes, wherein a considerable flow of air or other inert gas is recirculated over steam coils or other heating elements and through or against the bed of polymer material slowly moving through the dryer on a perforated conveyor belt or screen. The preferred drying temperature is usually between 200° F. and 350° F. and is dependent upon the molecular weight of the polymer being handled and the time of exposure to said drying temperature. It is desirable, where possible, to avoid softening the polymer in the dryer by too long exposure to high temperatures so as to permit better circulation of air through the bed. However, with some products, softening takes place quite readily and in these cases the avoidance of softening would limit temperatures to a degree which gives very slow drying rates. In such cases, it is usually more effective to accept the softening and the consequent low air rate through the bed and to operate at considerably higher temperatures, limited by the tendency of the polymer to adhere to the perforated plates or by the danger of deteriorating the product quality. For rapid conveyor speeds, i. e., short residence times in the dryer, higher drying temperatures can be used than for slow conveyor speeds.

Polymers such as polyiso-olefins and copolymers of iso-olefins with diolefins prepared at low temperatures in the presence of Friedel-Crafts type catalysts tend slowly to undergo a reduction in molecular weight and a deterioration in physical properties upon prolonged exposure to air at temperatures even as low as 200° F. Also, polymers of the lower molecular weight ranges tend to fuse when subjected to temperatures in the drying range for appreciable lengths of time, tending to decrease the bed thickness and size of voids in the layer of material on the conveyor and causing the polymer to stick to the conveyor, thus decreasing the air flow, increasing the necessary drying time and generally decreasing the efficiency of operation. With medium or low molecular weight stocks, softening may occur so readily that drying rates are very poor if the temperature is maintained low enough to avoid softening. Although higher temperatures give low or almost no air flow through the bed, the corresponding high vapor pressure and diffusion aids the drying so that it frequently pays to run the dryer as hot as possible. In many cases, therefore, the latter portion of the dryer will operate mainly as an impingement or cross-circulation dryer due to softening and coalescence of the polymer on the dryer belt. In such cases the practical limit on the temperature in the dryer, aside from oxidation or breakdown of the polymer is set by the tendency of the product to stick to the screen or dryer plates.

As pointed out above, it has been attempted to overcome this problem of sticking by coating the conveyor surfaces with a suitable anti-sticking agent but none of the prior materials have been sufficiently satisfactory to allow the temperature to be materially increased without requiring frequent interruptions for cleaning the surfaces. According to the present invention much higher temperatures can be reached and more satisfactory operation can be obtained, from the standpoint of capacity as well as eliminating fouling of the equipment, by the use of non-volatile fatty oil-water emulsion and an emulsifying agent as a coating for the conveyor screens. Suitable emulsifying agents include sodium salts of sulfonated petroleum hydrocarbons, esters of sodium sulfosuccinic acid, the sodium salt of sulfonated lauryl alcohol, the sodium salt of a polymerized alkaryl sulfonic acid, a mixture of 60% of the sodium salt of water soluble petroleum sulfonate, 25% isopropyl alcohol and 15% water. Oils preferred for use in the emulsions for coating the hot conveyor surfaces are castor oil and corn oil, but others which have been found suitable include other vegetable oils such as rape seed, cotton seed oil and soy bean oil, fish oils and animal oils such as lard oil.

It is important that the particular oil chosen have a low vapor pressure in order to permit its use at dryer temperatures of about 200°–350° F. It is preferable that the oil be of a non-drying or semi-drying nature, since drying oils tend to cause increased fouling of the equipment surfaces by the building up of an adherent film or coating. This tends to increase the frequency or difficulty of cleaning the conveyor screens or other portions of the equipment. In order to reduce the tendency for the oil to undergo undesirable changes, such as polymerization or sludge deposition, oils previously processed as by hydrogenation or oxidation can be used and known inhibitors for oxidation, polymerization or decomposition may be added to the oil.

The emulsion is applied to the desired surfaces of the apparatus by brushing, spraying or by other known means. This may be accomplished either manually or automatically, for example, by means of applicators having a brushing, wiping or rolling action or by suitable spray nozzles. In the case of continuous operation, as for example using tunnel type dryers, a preferred method is to spray the emulsion onto the surface of the conveyor during its "return pass" for example just ahead of the polymer-loading point, using automatically operated spray nozzles whose motion or delivery is synchronized with the travel of the conveyor. The emulsion may be heated, if desired, to obtain a suitable fluidity. The quantity required is relatively small and is of course dependent upon the type of oil chosen, type of polymer being handled, temperature of operation, and other operating variables. The emulsion has excellent spreading qualities which help to assure complete coverage of the surface coated, even though the quantity of emulsion used is small. It has been found possible to obtain satisfactory operation in plant scale tests when using no more than 0.5 pound of emulsion per 100 pounds of polymer handled, and under favorable conditions, an emulsion consumption of about 0.1 to 0.2 pound per 100 pounds of polymer or even less can be used.

Successful tests have been conducted using various oils in the emulsion, but in particular cator oil, and corn oil have been employed on the conveyor sections of a polymer dryer and have satisfactorily prevented the polymer from sticking to the conveyor surfaces. Furthermore, the use of a properly chosen oil does not appreciably affect the properties of the finished polymer since only a portion of the total quantity of oil used clings to the polymer and appears ultimately in the product. When producing polymers which are later to be cured, it is preferable to employ non-drying oils or to select oils of relatively low iodine number, since unsaturated oils tend to have an undesirable effect on the properties of the cured products. Suitable emulsions useful in this invention include the following:

1. 40% castor oil
   40% water
   20% emulsifier*

2. 40% refined rape seed oil
   40% water
   20% emulsifier*

3. 40% blown rape seed oil
   40% water
   20% emulsifier*

4. 50% corn oil
   37.5% water
   12.5% emulsifier*

5. 20% blown rape seed oil
   20% refined rape seed oil
   40% water
   20% emulsifier*

*A mixture of 60% sodium salt of water soluble petroleum sulfonic acids, 25% isopropyl alcohol and 15% water.

The following experiment illustrates the advantages of the invention:

An emulsion was prepared by mixing in an open-top drum 15 gallons castor oil, 15 gallons water and 7½ gallons sodium sulfonate solution consisting of 60% of the sodium salt of water soluble petroleum sulfonate, 25% isopropyl alcohol and 15% water. After agitating for one hour, the emulsion was pumped into a spray gun drum, which was equipped with an agitator, and applied to the drier screens of a butyl rubber plant.

No sticking was observed and after a trial of eight days, a considerable reduction in castor oil consumption (approximately 60%) resulted when the castor oil was used in the form of an emulsion than when it was used straight, as indicated below:

| Castor Oil Consumption For 8 days Prior to Use of Castor Oil Emulsion | | Castor Oil Emulsion Consumption for 1st 8 days of Test | |
|---|---|---|---|
| Date | Gal. Castor Oil | Date | Gal. Castor Oil Emulsion |
| 7-1 | 15 | 7-9 | 30 |
| 7-2 | 16 | 7-10 | 15 |
| 7-3 | 17 | 7-11 | 30 |
| 7-4 | 15 | 7-12 | 22 |
| 7-5 | 15 | 7-13 | 37 |
| 7-6 | 15 | 7-14 | 15 |
| 7-7 | 20 | 7-15 | 5 |
| 7-8 | 15 | 7-16 | 4 |

The polymer leaving the dryer or heating zone can be cooled directly for packaging or use; or it can be further processed as by extrusion, compressing, kneading, milling or sheeting in order to homogenize or compact the polymer, reduce its porosity, or assist the escape of entrapped moisture or other vapors which may have been formed or liberated within the polymer particles during the heating step.

While one specified process embodying the novel steps of the present invention, as well as one specific apparatus for carrying out the same has been described in considerable detail, it is to be understood that this description is illustrative only, and for the purpose of making the invention more clear, and it is not intended that the invention shall be construed as limited to details of the description except insofar as such limitations have been included in the terms of the following claims in which it is the intention to claim all novelty inherent in the process according to the present invention.

The nature and objects of the present invention having been thus described and illustrated, what is claimed as new and useful and is desired to be secured by Letters Patent is:

1. A method of treating solid high molecular weight tacky polymers prepared from mixtures containing substantial amounts of iso-olefins which comprises heating the polymer while passing through a zone on conveyors the polymer-contacting surfaces of which are coated with the non-volatile residue of a fatty oil emulsion consisting essentially of about 40 to 50% of a fatty oil selected from the group consisting of non-drying and semi-drying fatty oils, having a low vapor pressure at 200–350° F., about 12½ to 20% of an emulsifying agent consisting essentially of a sodium sulfonate, and the balance of an aqueous dispersing medium consisting of at least a major proportion of water.

2. A method of drying polymers prepared from mixtures containing substantial amounts of iso-olefins, which comprises continuously conveying the polymer through a drying zone on conveyors the conveyor surfaces of which are coated with an emulsion the non-volatile constituents of which are corn oil and a sodium sulfonate emulsifying agent.

3. A method of drying polymers prepared from mixtures containing substantial amounts of iso-olefins, which comprises continuously conveying the polymer through a drying zone on conveyors the conveyor surfaces of which are coated with an emulsion the non-volatile constituents of which consist essentially of rape seed oil and a sodium sulfonate emulsifying agent.

4. A method of drying polymers prepared from mixtures containing substantial amounts of iso-olefins, which comprises continuously conveying the polymer through a drying zone on conveyors the conveyor surfaces of which are coated with an emulsion the non-volatile constituents of which consist essentially of castor oil and a sodium sulfonate emulsifying agent.

5. A method of drying polymers prepared from mixtures containing substantial amounts of iso-olefins, which comprises continuously conveying the polymer through a drying zone on conveyors the conveyor surfaces of which are coated with an emulsion comprising of 40% castor oil, 40% water and 20% of an emulsifier comprising 60% of the sodium salt of water-soluble petroleum sulfonic acids, 25% isopropyl alcohol and 15% water.

6. In the process of finishing solid high molecular weight copolymers prepared from mixtures of iso-olefins and other unsaturated hydrocarbons at temperatures below about $-20°$ F. in the presence of a Friedel-Crafts type catalyst which comprises discharging the cold polymer and associated low-boiling materials such as unreacted olefinic materials, solvents, diluents and the like into water in order to form a slurry of polymer in water and flash off the bulk of said associated low-boiling materials, stripping said low-boiling materials from the water slurry of polymer, separating the polymer particles from the water slurry, passing the separated polymer particles through a tunnel-type dryer on a screen conveyor, passing heated air over and through a bed of polymer particles passing through the dryer to remove moisture and residual volatiles from the polymer, the improvement consisting in coating the polymer-contacting surfaces of the screen conveyor with an emulsion consisting essentially of about 40 to 50% of a fatty oil selected from the group consisting of non-drying and semi-drying fatty oils which are substantially non-volatile at 200–350° F., and emulsifying amount of a sodium sulfonate emulsifying agent, and the balance consisting of an aqueous liquid medium comprising at least a major proportion of water, the amount of said emulsion used during continuous operation being about 0.1 to 0.5 lb. of the emulsion per 100 lbs. of polymer handled through the dryer.

GRADY R. SCOTT.

REFERENCES CITED

The following references are of record in the file of this patent:

UNITED STATES PATENTS

| Number | Name | Date |
|---|---|---|
| 539,443 | Proctor | May 21, 1895 |
| 2,206,046 | Pollard | July 2, 1940 |
| 2,257,167 | Gerhardt et al. | Sept. 30, 1941 |
| 2,340,035 | Zimmer et al. | Jan. 25, 1944 |
| 2,401,754 | Green | June 11, 1946 |
| 2,532,985 | Bannon et al. | Dec. 5, 1950 |